J. E. Andrews,
Planing Machine,
№ 4,283. Patented Nov. 21, 1845.
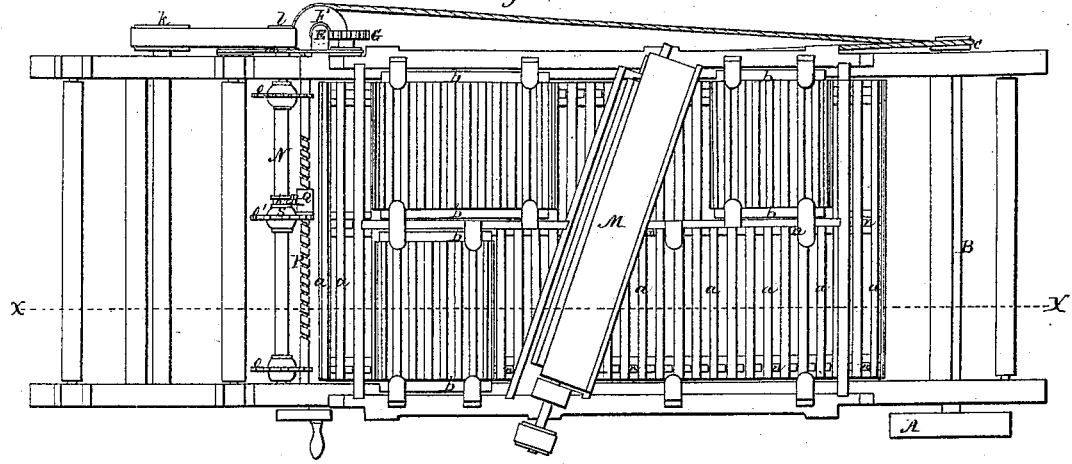
Fig: 2.
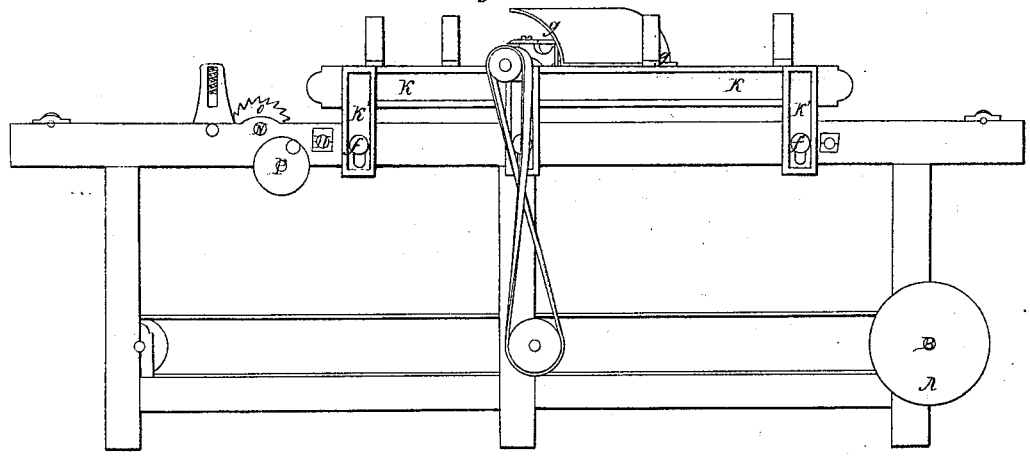
Fig: 1.
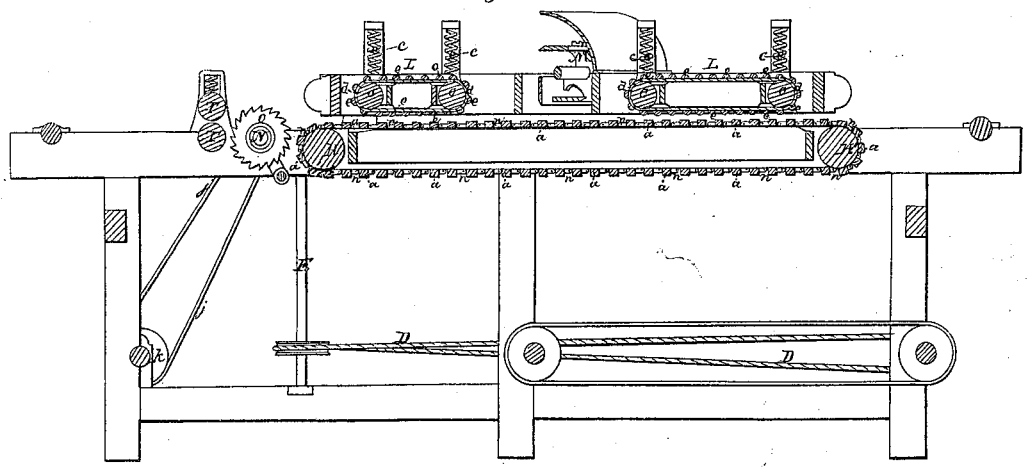
Fig: 3.

UNITED STATES PATENT OFFICE.

JOSEPH E. ANDREWS, OF BOSTON, MASSACHUSETTS.

PLANING-MACHINE.

Specification of Letters Patent No. 4,283, dated November 21, 1845.

*To all whom it may concern:*

Be it known that I, JOSEPH E. ANDREWS, of the city of Boston, in the State of Massachusetts, have invented certain new and useful Improvements in the Manner of Constructing Machines for the Planing and Jointing of Boards and Planks; and I do hereby declare that the following is a full and exact description thereof.

In my machine, the board, or plank, to be planed is placed upon an endless horizontal platform, consisting of logs, or slats, of iron which are hinged together in the manner of some endless floors, or platforms, for horse powers. This platform passes around rollers at its ends, one of which is made to revolve by suitable gearing, and thus to advance the board, or plank, that is placed upon it. The upper side of the endless platform runs upon ways by which it is sustained and kept from swagging. Above this revolving platform, I place other endless platforms, or aprons, usually four in number, which are constructed somewhat like that already described, but instead of making them entirely of iron, I form them of leather, or other suitable material, and across these I place logs, or slats, of iron extending from side to side of the aprons, half an inch, or an inch, apart, and riveted thereto; these slats may be half round, their flat sides being toward the apron; their rounded ones being intended to form a number of continuous and successive bearings on the board which is being operated upon. These endless aprons, like the platform, turn upon rollers at their ends, and their lower sides bear against ways which cause the slats to press upon the board the whole length of the apron.

I generally construct my machine so that it may plane a board of considerable width, say of eighteen inches, more or less; but in such a machine boards less than half this width may be passed through two at a time, resting on the same platform, and being dressed by the same revolving cutters.

My upper endless aprons are usually, as above stated, four in number, two of which are in advance, and two in the rear, of the planing wheel; each of these aprons occupies but about one half of the width of the machine; these have each its own frame within which are the rollers upon which the aprons revolve; and they are received in compartments in an independent frame situated immediately above the revolving platform; this independent frame sustains the planing wheel also, and it is so arranged as that it may be raised, or lowered, at pleasure, for the purpose of adapting it to stuff of different thicknesses.

My planing wheel I place obliquely across the machine, by which means it is made to cut more smoothly than when the cutters stand at right angles with the sides. The precise angle which the axis of the planing wheel makes with the sides of the plank, or of the machine, is not a point of importance, and may be between twenty and forty degrees, but is should be such as to cause the cutters to operate as skew irons. The planing wheel may, of course, be made to stand straight across, as in other machines, but the oblique position is much to be preferred.

In the machines heretofore in use which were furnished with a revolving planing wheel, the cutters, if placed obliquely, would have caused the boards on which they acted to shift laterally; but the firm pressure to which the board is subjected between the platform and the endless aprons, constructed in the manner above described, effectually counteracts any tendency to lateral movement.

The jointing I effect by means of circular saws which operate upon the board as it is leaving the planing machine. These circular saws are placed on a shaft which crosses the machine in front of the revolving platform. The number of saws to be placed on it will depend upon the number of pieces into which the planed board is to be divided; when two boards are being planed at the same time, and they are each to be jointed on their edges, four saws will be required. When a wide board is to be cut into four narrow ones, five saws will be necessary. It is a point of great importance to be able to shift these saws, readily, upon their shaft, so as to adapt them precisely to the width of the stuff to be cut. To effect this, I place one, two, or more, of the saws upon hubs that are made to slide truly on the shaft, and to revolve with it by means of a feather; these saws I shift, as desired, in the following manner. I place as many adjusting shafts across the machine as there are shifting saws. Upon these shafts I cut a screw thread, and adapt to them screw sockets, or sliding nuts, from which short arms proceed, the outer ends of which are received into grooves surrounding the hubs of the shifting saws; and by turning the screw shaft appropriate to either of the saws it may be instantaneously shifted to the point desired.

In the accompanying drawing, Figure 1, is a side elevation of my machine; Fig. 2, is a top view of it, and Fig. 3, a longitudinal, vertical section thereof, in the line $x, x$, of Fig. 1.

In each of these figures, where the same parts are shown they are designated by the same letters of reference.

A, is a whirl on the main shaft B, to which the power may be applied from the first mover; C, is a whirl on the opposite end of the shaft B, from which a band, D, proceeds, and gives motion to the vertical shaft, E; a worm wheel, F, on the upper end of this shaft, takes into the wheel, G, on the end of the front roller of the revolving platform, and gives motion thereto, there being teeth on said roller which take into the spaces between the logs, or slats, of the platform.

H, H, are the gudgeons of the platform rollers, H′, H′; $a, a$, are the iron slats of said platform, which are connected together by hinges, $n, n, n$. The arrangement of these is shown, distinctly, in the section, Fig. 3.

J, J, is one of the ways that sustains the upper side of the platform, and upon which it slides.

K, K, is the independent frame which sustains the planing wheel, and within which are contained the endless aprons L, L, that serve to press on the board, or boards. Each of these aprons has its own frame, $b, b$, that drops into compartments between the frame work of the independent frame; one of these frames is left off on the top view, to show the slats, $a, a$, beneath them. The gudgeons of the rollers, $o, o$, on which the endless aprons, L, L, run have their boxes in the frames, $b, b$, and these frames are capable of moving up and down in their respective compartments within the independent frame; $c, c, c$, are spiral springs that bear upon the frames, $b, b;$ elliptic, or other, springs may, however, be substituted for these.

$d, d$, is the leather part of the endless apron, and $e, e$, the iron slats riveted thereto, which by their number and form clasp and hold the board firmly under the action of the springs by which they are pressed down. The independent frame may be fastened to the main frame by screw bolts, $f, f$, passing through the pieces, K, K, making a part of said frame. This frame may be raised, or lowered, by screws bearing against the lower ends of the pieces, K′, or by cams on shaft crossing the frame of the machine, on in other modes well known to machinists.

M, M, is the revolving planing wheel which does not differ materially from those in common use. When the machine is intended for planing wide stuff, the cutters must each be in one piece, as represented in the drawing but in those places where it is to be used for planing flooring boards only, or other narrow stuff, the cutters may, if desired, be divided into two lengths. I have represented the planing wheel as placed obliquely, in the manner, and for the purpose, above made known. I surround the cutter wheel in part by a guard plate, $g, g$, to prevent the scattering of the chips; but in the top view I have omitted this, in order to show the planing wheel the more distinctly, but it is shown in the section.

N, N, is the saw, or jointing shaft, having on it the saws, O, O, O; only one of which, O′, is represented as adjustable, this being sufficient to exhibit the manner of moving them.

P, is a shaft having a screw thread cut on it, and Q, a nut, or female screw, fitted thereto; from this proceeds the arm, R, the outer end of which is fitted to enter a groove, $h$, on the hub, S, of the saw. Under this arrangement it will be seen that if the shaft P, be turned by means of a winch, or otherwise, the saw may be made to slide to any desired part of the shaft, N. The saw shaft may be driven by a band $j$, embracing the whirls $k$, and $l$. As the planed board escapes from the revolving platform it meets the saws, O, O, and is slit, and jointed, in the manner required. As the boards, or strips, leave the saws, they are carried between the rollers T, T, one of which is represented as driven by a band $m$, which causes the boards, or strips, to be carried clear of the saws.

In entering the boards upon the platform, and under the endless aprons, for the purpose of being planed, care is to be taken that they are entered in a direct line, which is easily done by placing their outer edges against guide pieces; and after they have been thus entered no fear need be entertained that they will deviate from the straight path, the nature of the parts between which they are passed being such that a very considerable degree of force would be necessary to cause them to move laterally.

Having thus, fully described the manner in which I construct my planing and jointing machine, and shown how the respective parts thereof operate, what I claim therein as new, and desire to secure by Letters Patent, is—

The manner herein set forth of forming, arranging and combining with the revolving cutter wheel, the revolving platform, and the endless aprons, between which the board to be planed is to be passed; by means of which arrangement and combination it is firmly held along the whole length of such apron, and carried regularly forward, without deviation.

JOSEPH E. ANDREWS.

Witnesses:
 THOS. P. JONES,
 EDWIN L. BRUNDAGE.